United States Patent [19]

Kobayashi

[11] Patent Number: 4,992,660
[45] Date of Patent: Feb. 12, 1991

[54] SCANNING TUNNELING MICROSCOPE
[75] Inventor: Hideo Kobayashi, Tokyo, Japan
[73] Assignee: Jeol Ltd., Tokyo, Japan
[21] Appl. No.: 543,449
[22] Filed: Jun. 25, 1990
[30] Foreign Application Priority Data Jun. 26, 1989 [JP] Japan .................................. 1-163224
Jun. 30, 1989 [JP] Japan .................................. 1-170003
Jul. 7, 1989 [JP] Japan .................................. 1-176920

[51] Int. Cl.$^5$ .................................................. H01J 37/067
[52] U.S. Cl. .................................. 250/306; 250/307;
250/440.1; 250/442.1
[58] Field of Search .................. 280/306, 310, 440.1,
280/442.1, 307; 73/105

[56] References Cited
U.S. PATENT DOCUMENTS 4,880,975 11/1989 Nishioka et al. .................... 250/306
4,894,537 1/1990 Blackford et al. .................. 250/306
4,945,235 7/1990 Nichioka et al. .................... 250/306

Primary Examiner—Jack I. Berman
Assistant Examiner—Kiet T. Mguyen
Attorney, Agent, or Firm—Webb, Burden, Ziesenheim & Webb

[57] ABSTRACT

A scanning tunneling microscope using a tip which can be easily replaced. The microscope includes a piezoelectric drive mechanism for driving the tip, a tip holder to which the tip is attached, and a sample holder. The tip holder can be detachably mounted to the piezoelectric drive mechanism. The Z-axis of a coordinate system extends through the tip holder and across the sample surface during observation. A replacement rod for replacng the tip holder is mounted so as to be movable along the Z-axis.

5 Claims, 4 Drawing Sheets

SCANNING TUNNELING MICROSCOPE

FIELD OF THE INVENTION

The present invention relates to a scanning tunneling microscope which brings a tip close to a sample to detect tunneling currents and to create an image of the surface topography.

BACKGROUND OF THE INVENTION

In a scanning tunneling microscope as disclosed in U.S. Pat. No. 4,343,993, a tip is required to be sharpened to observe the sample surface with atomic-resolution. In recent years, therefore, the tip has been machined and sharpened by electropolishing so that the fine tip is constituted of only one atom.

When a sample is observed with a scanning tunneling microscope, it is necessary to reduce the distance between the tip and the sample surface to about 1 nm to obtain a tunneling current between the tip and the sample surface. When the tip is being brought close to the sample surface, the tip may come into contact with the sample. As a result, the front end of the tip or the sample may be damaged. If the front end of the tip is damaged, it is impossible to obtain atomic-resolution and, therefore, it is necessary to replace the tip with a new one. If the sample is damaged, it is necessary to replace it with a new sample or change specimen position.

However, skill is needed to replace such a fine tip. Also, replacement of the tip and the sample can only be performed after breaking the ultrahigh vacuum in the vacuum vessel accommodating the tunneling microscope. Thus, it takes a long time to restart the observation.

Before surface analysis is made with a scanning tunneling microscope, it is necessary to clean the sample surface. For this purpose, the sample is heated at about 1200° C. to remove contaminants from the sample surface, or the surface is treated by ion sputtering or another method. When the sample surface is treated in this way, the contaminants evaporating from the sample may adhere to the tip, or the tip may be damaged by heat radiating from the sample.

SUMMARY OF THE INVENTION

It is an object of the present invention to provide a scanning tunneling microscope equipped with a tip which can be easily replaced.

It is another object of the invention to provide a scanning tunneling microscope which permits the tip and the sample to be replaced easily.

It is a further object of the invention to provide a scanning tunneling microscope which permits the tip and the sample to be replaced quickly while maintaining the ultrahigh vacuum.

It is yet another object of the invention to provide a scanning tunneling microscope equipped with a mechanism which, when the sample is being treated, moves the tip away from the sample.

In one embodiment of the invention, the scanning tunneling microscope comprises a tip holder having a tip, a piezoelectric drive mechanism which drives the tip and to which the tip holder is detachably mounted, and a sample holder. It is assumed that the Z-axis of a coordinate system extends through the tip holder and across the surface of the sample during observation. This microscope is characterized in that a replacement rod for replacing the tip holder is mounted so as to be movable along the Z-axis, and is further characterized in that a mechanism is provided to bring the sample away along the Z-axis during the replacement.

In another embodiment of the invention, the scanning tunneling microscope comprises a tip holder having a tip, a piezoelectric drive mechanism which drives the tip and to which the tip holder is detachably mounted, a sample holder, and a sample stage on which the sample holder is mounted. It is assumed that the Z-axis extends through the tip holder and across the sample surface during observation. This microscope is characterized in that a replacement rod having a chuck gripping the sample holder or the tip holder is mounted so as to be movable along the Z-axis. The sample holder and the tip holder are replaced on the Z-axis by means of the replacement rod.

In a further embodiment of the invention, the scanning tunneling microscope comprises a tip drive unit for driving a tip mounted detachably, an observation chamber accommodating the drive unit, a transfer chamber connected with the observation chamber via a first partition valve, a preliminary chamber connected with the transfer chamber via a second partition valve, an insertion rod for inserting a new tip into the transfer chamber via both preliminary chamber and second partition valve, a moving member which can carry new tips introduced by the insertion rod and can be moved inside the transfer chamber between a first position where the new tips are installed on the moving member and a second position where the new tips are inserted into the observation chamber, and a replacement rod which, when the moving member is in the second position, receives a new tip from the moving member and carries the tip into the observation chamber via the second partition valve.

In still another embodiment of the invention, the above-described moving member takes the form of a transfer rod capable of moving between the aforementioned first and second positions inside the transfer chamber. A plurality of new tips are detachably installed radially around the axis of the transfer rod.

In yet another embodiment of the invention, the scanning tunneling microscope comprises a tip, a sample stage holding a sample in such a way that the tip is poised above the sample surface along the Z-axis, a piezoelectric drive mechanism driving the tip, a base on which the sample stage and the tip drive unit are disposed, and a means for moving the drive mechanism along the Z-axis between a first position at which the mechanism is close to the sample on the base and disconnected from the drive mechanism and a second position at which the mechanism is distant from the sample.

Other objects and features of the invention will appear in the course of the description thereof which follows.

DETAILED DESCRIPTION OF THE INVENTION

Figure 1:
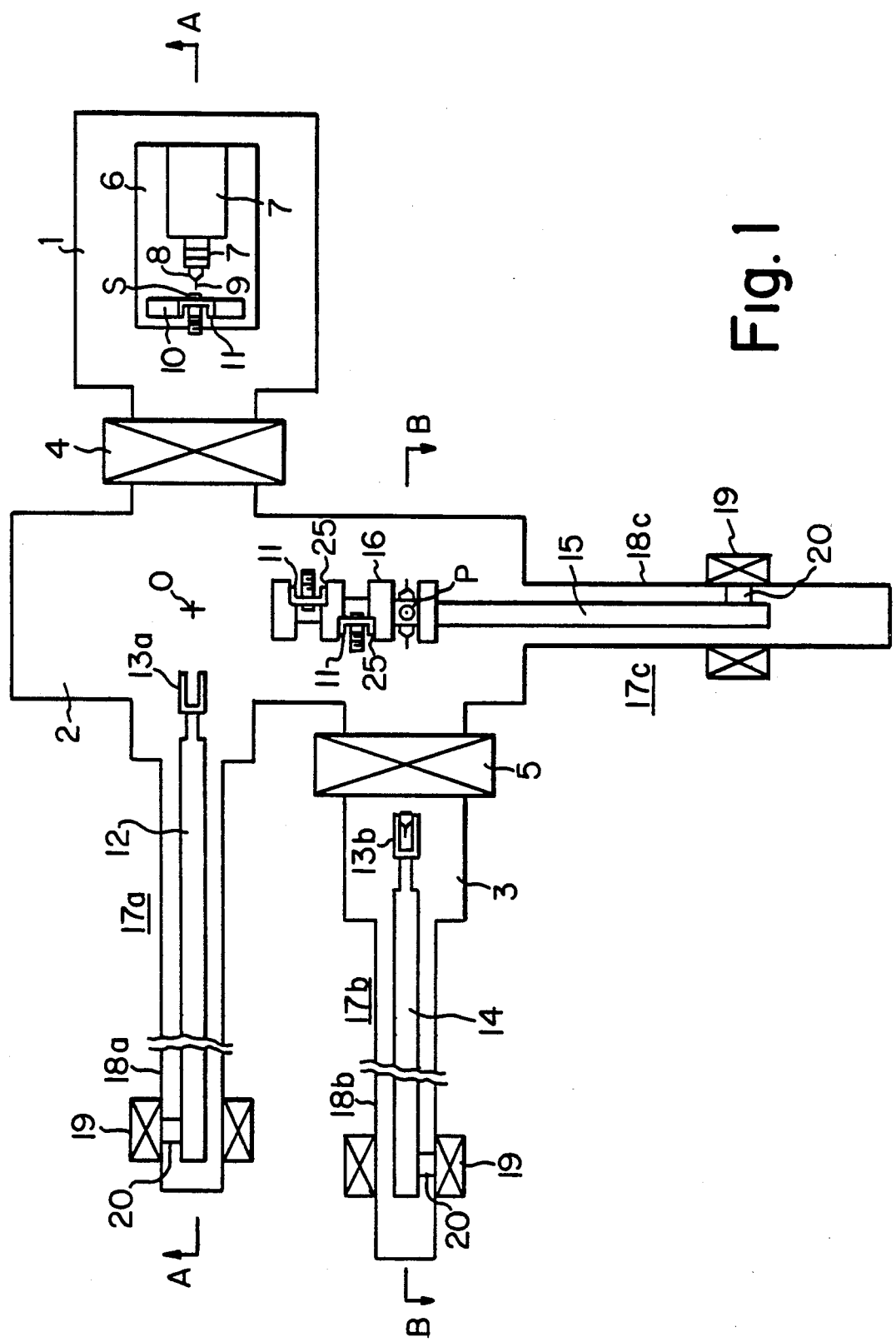
FIG. 1 is a schematic view of a scanning tunneling microscope according to the invention.

Referring to FIG. 1, there is shown a scanning tunneling microscope according to the invention. This microscope comprises an observation chamber 1, a transfer chamber 2, and a preliminary chamber 3. Partition valves 4 and 5 separate the transfer chamber from the observation chamber and preliminary chamber, respectively. A base 6, a tip drive mechanism 7, a tip socket 8 to which a tip 9 is firmly fixed, sample stages 10 and sample holders 11 are shown positioned within the observation chamber. A replacement rod 12, chucks 13a and 13b on the ends of the introduction and replacement rods, respectively, an introduction rod 14, a transfer rod 15, a magazine 16 capable of holding a plurality of tip sockets and a plurality of sample holders, and magnetically coupling-and-transporting devices 17a, 17b, 17c are arranged to move tips and sample holders. The device 17a comprises a magnet 19 movably mounted on the outside of a guide 18a and a magnetic member 20 mounted on the replacement rod 12 which is disposed inside the guide 18a. The inside of the guide 18a is maintained as a vacuum. The magnet 19 is placed outside the vacuum. The magnetically coupling-and-transporting device 17b is composed of a magnet 19 mounted on the outside of the guide 18b and a magnetic member 20 mounted on the introduction rod 14 that is disposed inside the guide 18b. The inside of this guide 18b is maintained as a vacuum. This magnetic member 20 is placed outside this vacuum. The magnetically coupling-and-transporting device 17c is comprised of a magnet 19 mounted on the outside of the guide 18c and a magnetic member 20 mounted on the transfer rod 15 that is disposed inside the guide 18c. The inside of the guide 18c is maintained as a vacuum. This magnetic member 20 is placed outside the vacuum. Samples S (only one is shown) are held on the sample stages 10 by their respective sample holders 11. The observation chamber 1 is connected with the transfer chamber 2 via the partition valve 4. The preliminary chamber 3 is connected with the transfer chamber 2 via the partition valve 5. The transfer rod 15 and the replacement rod 12 meet at a position O, where the tip socket and the sample holder on the transfer rod 15 are transferred to the replacement rod 12. The transfer rod 15 and the introduction rod 14 meet at a position P, where the tip socket and the sample holder on the introduction rod 14 are transferred to the transfer rod 15.

The observation chamber 1, the transfer chamber 2, and the preliminary chamber 3 are evacuated by evacuating apparatus (not shown). The observation chamber 1 and the transfer chamber 2 are evacuated to an ultrahigh vacuum.

Figure 2:
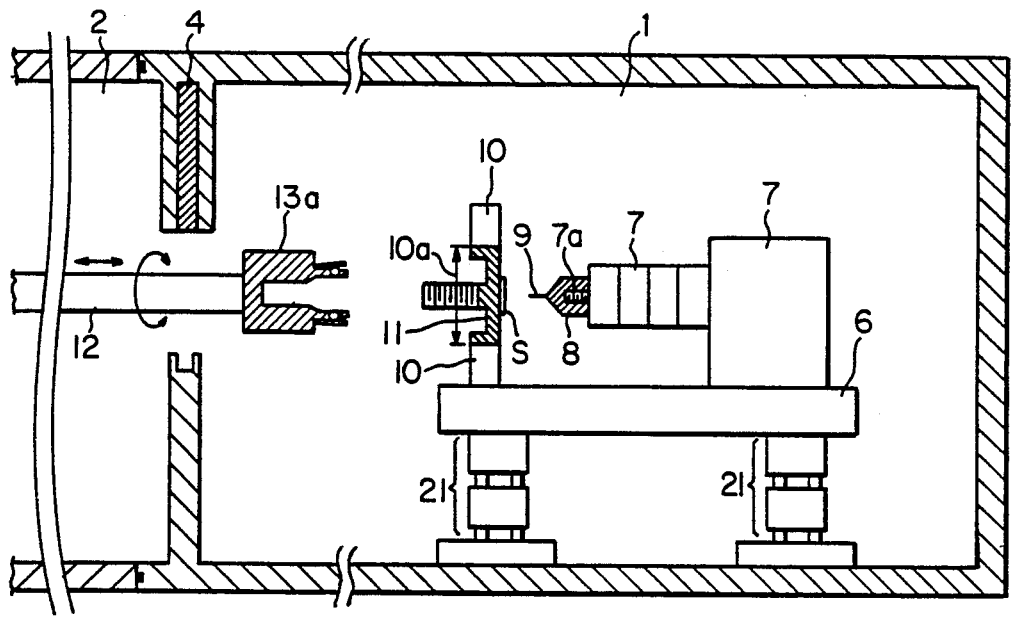
FIG. 2 is a fragmentary enlarged section view of the microscope taken along line A—A of FIG. 1.

The mechanism for replacing tips and samples and replacement operations are next described by referring to FIG. 2. The base 6 is mounted on vibration isolators 21 inside the observation chamber 1. The tip drive mechanism 7 and the sample stage 10 are mounted on the base 6. An external thread 7a is formed at the front end of the drive mechanism 7. The tip socket 8 is screwed over the external thread 7a. The sample stage 10 is provided with an opening 10a in which the sample holder 11 is fitted. It is assumed that the Z-axis of a coordinate system extends through the tip 9 and across the surface of the illustrated sample S. The replacement rod 12 is inserted so as to be movable along the Z-axis. A chuck 13a for holding a sample holder and a tip socket is mounted at the front end of the replacement rod 12.

Figure 4:
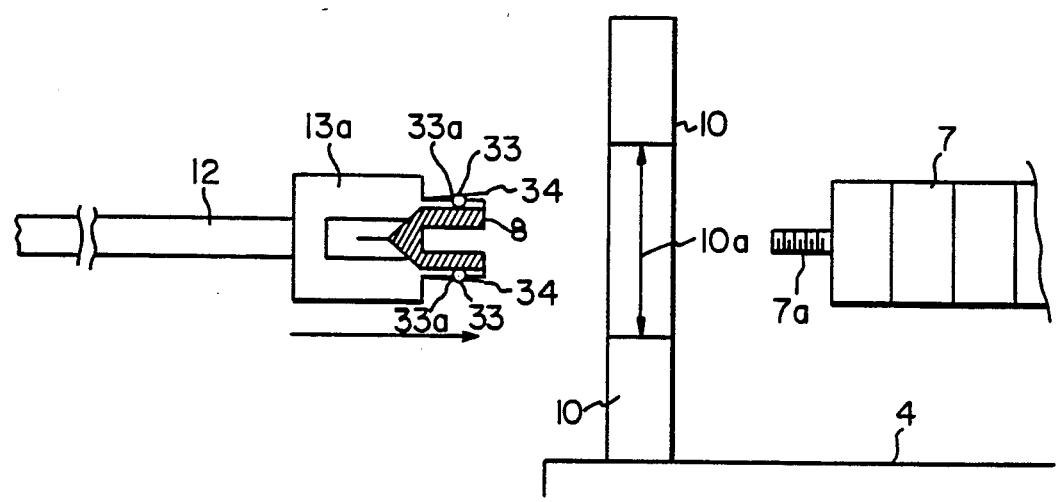
FIGS. 4 and 5 are enlarged views of main portions of the microscope shown in FIG. 2.

FIG. 4 shows the condition in which a tip socket 8 is held by the chuck 13a. This chuck 13a at the front end of the replacement rod 12 includes rollers 33 having open-ended bores 33a and leaf springs 34 that press the rollers 33 against the socket 8. The rollers are permitted by the open-ended bores to bear upon the socket when it is inserted in the chuck but not to pass out of the bores when the chuck is removed. Thus, the socket 8 is gripped by the chuck 13a.

Figure 5:
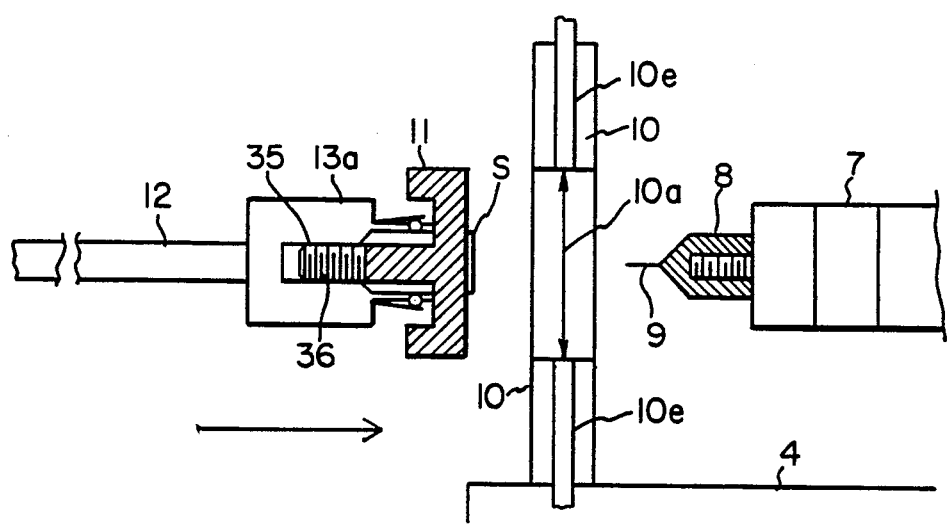

FIG. 5 shows the condition in which a sample holder 11 is held by the chuck 13a. The chuck 13a at the front end of the replacement rod 12 has an internal thread 35. The holder 11 has an external thread 36 which is screwed into the internal thread 35 to hold the sample holder 11.

The tip socket and the sample holder are replaced in the manner described now. Referring to FIG. 2, when the tip socket should be replaced, the tip socket 8 held by the chuck 13a on replacement rod 12 is moved to the front end of the tip drive mechanism 7 through the opening 10a in the sample stage 10. (The specimen holder 11 was previously removed.) Then, the replacement rod 12 is rotated by the magnetically coupling-and-transporting device 17a to screw the tip socket 8 over the external thread 7a at the front end of the drive mechanism 7. As a result, the socket 8 is locked. Subsequently, the replacement rod 12 is moved back into the transfer chamber 2. Referring to FIG. 5, when the sample holder should be exchanged, the sample holder that is similarly held by the chuck 13a is conveyed into the opening 10a in the sample stage 10 by the replacement rod 12 so that the holder may fit into the opening 10a. The holder 11 is fixed to the stage 10 by a remotely actuated locking mechanism (not shown) including locking pins 10e mounted on the sample stage 10. Thereafter, the replacement rod 12 is moved back into the transfer chamber 2. The partition valve 4 installed between the observation chamber 1 and the transfer chamber 2 is closed. The inside of the observation chamber 1 is evacuated to an ultrahigh vacuum by the evacuating apparatus (not shown), and then observation is made.

The tip socket 8 can be disconnected from the tip drive mechanism 7 in the sequence opposite to the foregoing. Also, the sample holder can be disconnected from the sample stage 10 in the sequence opposite to the foregoing. It is to be understood that the invention is not limited to the above example and that various changes and modifications may be made. In the above example, the opening 10a is formed in the sample stage 10 so as not to impede passage of the replacement rod, thus allowing the replacement rod to reach the tip when the tip socket is replaced. For this operation, the sample holder inserted in the opening 10a is taken out of this opening 10a. It is also possible to make the sample stage 10 rotatable about an axis parallel to the Z-axis. In this case, when the tip socket is replaced, the sample stage is rotated, and the sample is moved away from the Z-axis.

In order to replace the tip socket and the sample holder quickly while maintaining the ultrahigh vacuum, the transfer rod 15 capable of being moved between the positions O and P inside the transfer chamber 2 and the magazine 16 holding a plurality of tip sockets and a plurality of sample holders at the front end of the transfer rod 15 are provided. Plural tip sockets and plural sample holders are detachably mounted on the magazine 16 and arranged radially. External threads are mounted around the magazine 16 and arranged radially. The tip sockets 8 are screwed over the external threads and held there. A plurality of openings 25 are formed in the outer surface of the magazine 16. The sample holders are fitted in these openings 25.

Figure 3:
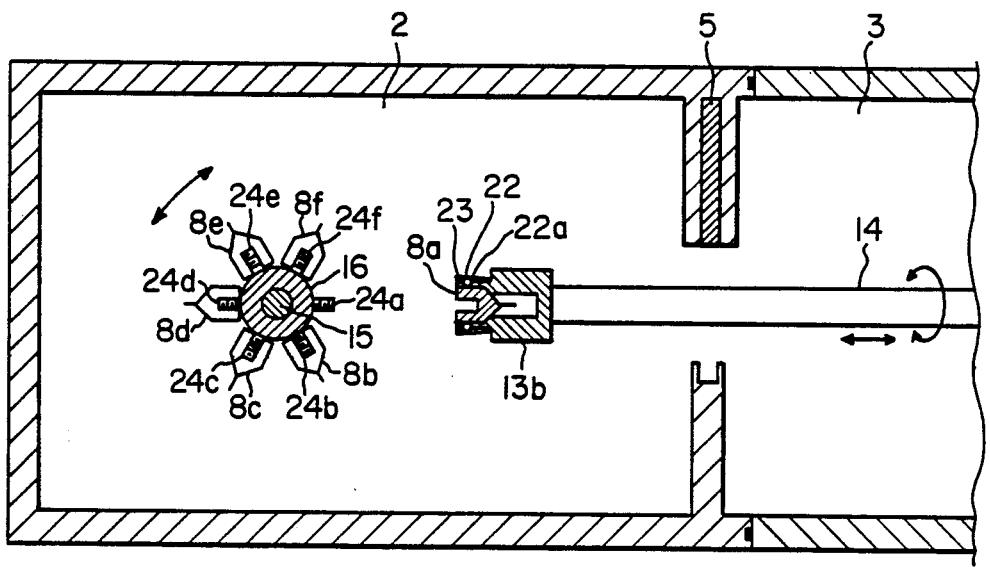
FIG. 3 is a fragmentary enlarged section view of the microscope taken along line B—B of FIG. 1, and in which a tip socket is hold by the chuck.

FIG. 3 shows the tip socket-holding portion of the magazine 16 in cross section. External threads $24a$—$24f$ are arranged radially around the magazine 16 mounted to the transfer rod 15. The tip sockets $8b$—$8f$ are screwed over the external threads $24b$—$24f$, respectively, and held there.

The introduction rod 14 is inserted from the same direction, i.e., along the Z-axis, as the replacement rod 12. A chuck $13b$ holding a sample holder or a tip socket is mounted at the front end of the introduction rod 14. In the condition shown in FIG. 3, the tip socket $8a$ is held by the chuck $13b$. This chuck $13b$ at the front end of the introduction rod 14 has rollers 22 having bores $22a$ and leaf springs 23. The leaf springs 23 are pressed against the rollers 22 to hold the socket $8a$ on the chuck $13b$.

The tip socket is mounted on the magazine 16 in the manner described now. The partition valve 5 installed between the transfer chamber 2 and the preliminary chamber 3 is closed. A tip socket is mounted to the chuck $13b$ on the introduction rod 14 in the preliminary chamber 3. The inside of the preliminary chamber 3 is evacuated to a high vacuum or an ultrahigh vacuum by the evacuating apparatus (not shown). Then, the partition valve 5 is opened. The tip socket $8a$ gripped by the chuck $13b$ at the front end of the introduction rod 14 is moved from the preliminary chamber 3 into the position P inside the transfer chamber 2 by the introduction rod 14. The socket $8a$ on the chuck $13b$ is moved into the position of the external thread $24a$ of the magazine 16 which is waiting at the position P in the transfer chamber 2. The introduction rod 14 is rotated by the magnetically coupling-and-transporting device $17b$ to screw the tip socket $8a$ over the external thread $24a$, thus locking the socket.

Then, the introduction rod 14 is pulled back into the preliminary chamber 3. The partition valve 5 between the transfer chamber 2 and the preliminary chamber 3 is closed, and the inside of the transfer chamber 2 is evacuated to an ultrahigh vacuum by the evacuating apparatus (not shown).

The magazine 16 on which tip sockets and sample holders have been set in this way is moved from the position P into the position O inside the transfer chamber 2 by the transfer rod 15. The chuck $13a$ installed at the front end of the replacement rod 12 is disposed at this position O. The chuck $13a$ grips one of the tip sockets installed on the magazine 16. Any desired socket can be selected by the chuck, by rotating the shaft of the transfer rod 15 and orienting the front end of the desired tip socket in the direction of insertion of the chuck.

The tip socket held by the chuck $13a$ is introduced into the observation chamber 1 from the transfer chamber 2 through the partition valve 4. The socket is then screwed over the external thread $7a$ formed at the front end of the drive mechanism 7 to lock the socket. When the replacement rod 12 is introduced into the observation chamber 1, the magazine 16 is moved backward into the position P by the transfer rod 15.

Similarly, one sample holder is selected by rotating the shaft of the transfer rod 15 and gripped by the chuck $13a$. The sample holder 11 is then introduced into the observation chamber 1 by the replacement rod 12 and fitted into the opening $10a$ in the sample stage 10. Subsequently, the replacement rod 12 is pulled back into the transfer chamber 2. The partition valve 4 installed between the observation chamber 1 and the transfer chamber 2 is closed. Thereafter, the inside of the observation chamber 1 is evacuated to an ultrahigh vacuum by the evacuating apparatus (not shown). In this way, observation is enabled.

In this example, one tip socket and one sample holder are installed on the magazine 16 at the front end of the transfer rod 15 by the introduction rod 14. The magazine on which plural tip sockets and plural sample holders have been previously installed may be introduced by the introduction rod 14 and mounting the magazine on the transfer rod 15. The transfer rod 15 that can be moved between the positions O and P inside the transfer chamber 2 may be replaced with a disk capable of rotating within a plane including the positions O and P. Plural tip sockets and plural sample holders may be detachably mounted on the outer periphery of the disk.

The tip and the sample surface can be pretreated at the position O in the transfer chamber 2 by installing an ion sputtering apparatus or evaporation apparatus at a position opposite to the surface of the sample on the sample holder and to the tip at the front end of the tip socket gripped by the chuck $13a$ on the replacement rod 12. The tip and the sample can be baked by mounting electrical contacts on the magazine and energizing the contacts.

Figure 6:
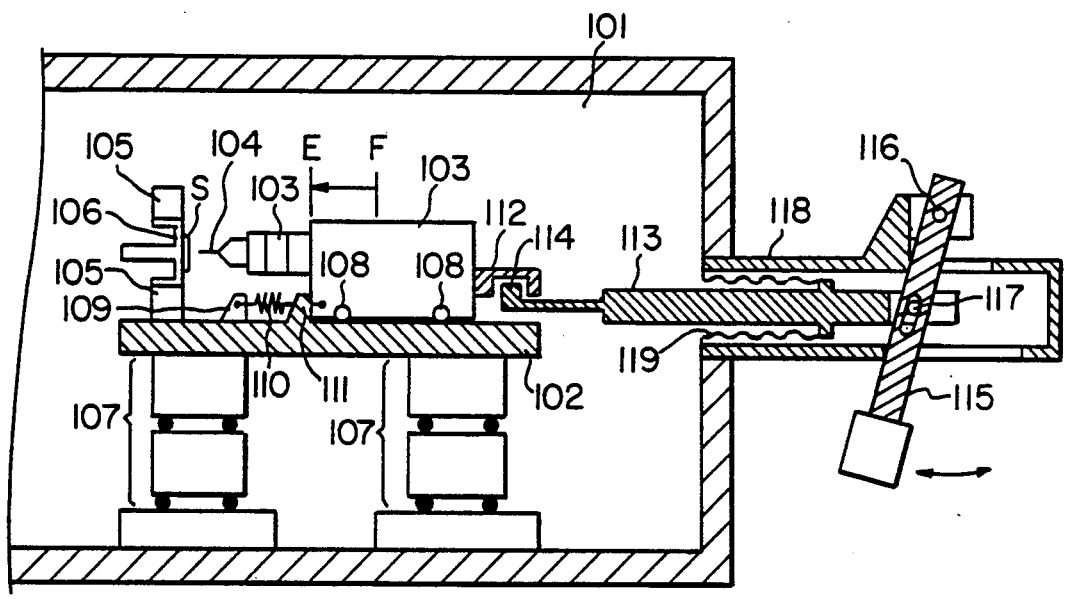
FIG. 6 is a schematic view of another scanning tunneling microscope according to the invention.
Figure 7:
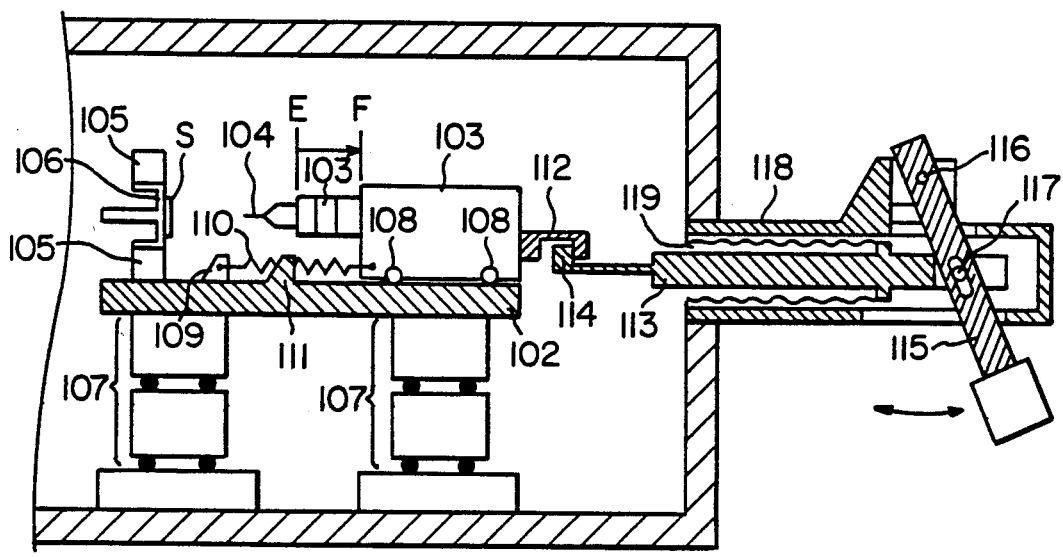
FIG. 7 is a view similar to FIG. 6, but showing another condition.

FIGS. 6 and 7 show another scanning tunneling microscope according to the invention. In these figures, the microscope is in different conditions. The microscope comprises an observation chamber 101, a base 102, a tip drive mechanism 103, a tip 104, a sample stage 105, a sample holder 106, vibration isolators 107, rollers 108, a pivot block 109, a spring 110, a stopper 111, a hook 112, a transfer rod 113, a claw 114, a lever 115, another pivot 116, a pin 117, a lever holder 118 and a bellows 119. A sample S is held on the sample stage 105 by the sample holder 106.

The inside of the observation chamber 101 is evacuated to a high vacuum or an ultrahigh vacuum by an evacuating apparatus (not shown). The base 102 is mounted on the vibration isolators 107 inside the observation chamber 101. The tip drive mechanism 103 and the sample stage 105 are disposed on the base 102. The drive mechanism 103 is carried on the rollers 108 on the base 102. It is assumed that the Z-axis of a coordinate system extends through the tip 104 and across the surface of the sample S. The drive mechanism 103 is mounted on the base 102 so as to be movable along the Z-axis. The drive mechanism 103 is pulled toward the sample stage 105 by the spring 110 mounted between one end of the mechanism 103 and the pivot 109 mounted to the base 102. At this time, the drive mechanism 103 bears against the stopper 111 mounted on the base 102 and comes to a stop at a position E. This position E is so set that the tip 104 is within tunneling distance of the sample S. This distance is of the order of nanometers.

The transfer rod 113 capable of being moved along the Z-axis is inserted in the lever holder 118 connected to the observation chamber 101. The claw 114 is mounted to one end of the transfer rod 113. The pin 117 is attached to the other end of the transfer rod 113. The lever 115 rotates about the pivot 116 mounted to the lever holder 118. The lever 115 is provided with a slot in which the pin 117 mounted to the transfer rod 113 is fitted. The transfer rod 113 and the lever holder 118 are sealed together by a flexible seal member 119 such as bellows to maintain the vacuum in the observation chamber 101. In the condition shown in FIG. 6, one end surface of the tip drive mechanism 103 is at rest at the observation position E. In this state, the claw 114 at the front end of the transfer rod 113 is at rest and does not engage with the hook 112 mounted to the drive mechanism 103.

When the sample S installed on the sample holder is heated by a heater (not shown), the lever 115 is rotated about the pivot 116 as shown in FIG. 7. This shifts the pin 117 to the right as viewed in this figure to move the transfer rod 113 to the right along the Z-axis. Then the claw 114 at the front end of the transfer rod 113 is brought into engagement with the hook 112 mounted to the tip drive mechanism 103. This mechanism 103 is moved into the position F and comes to a stop. In this way, the distance between the tip 104 and the surface of the sample S is increased by moving the drive mechanism 103. When the sample is heated or otherwise treated, contaminants evaporating from the sample are prevented from adhering to the tip. Also, the tip is prevented from becoming damaged if radiation heat is produced from the sample.

After the completion of the heating of the sample, the lever 115 is rotated about the pivot 116 as shown in FIG. 6. Since the tip drive mechanism 103 is pulled toward the sample stage 105 by the spring 110 mounted between the mechanism 103 and the pivot 109 on the base 102, the drive mechanism 103 is moved toward the sample. Then, the mechanism comes into contact with the stopper 111 and stops at the observation position E. Therefore, when the sample is observed, no vibration is transmitted to the tip drive mechanism 103 via the transfer rod 113 inserted through the wall of the observation chamber 101.

In this example, the tip drive mechanism 103 is pulled towards the sample stage by the spring 110 mounted between the mechanism and the pivot 109 mounted to the base 102 to cause the mechanism 103 to bear against the stopper 111 and to stop at the position E. Alternatively, a spring may be provided to bias the tip drive mechanism toward the sample so that the mechanism may bear against the stopper and stop at the position E. In the above example, the transfer rod is moved along the Z-axis by the lever. The transfer rod may also be moved along the Z-axis by a micrometer of other driving mechanism utilizing a screw.

As can be understood from the description made thus far, in one embodiment of the invention, the replacement rod for replacing the tip holder such as the tip socket is mounted so as to be movable along the Z-axis which connects the tip holder and the sample when observation is made. A mechanism is provided to move the sample away from the Z-axis during the replacement. Consequently, the tip holder can be replaced easily.

In another embodiment of the invention, the scanning tunneling microscope comprises a tip holder to which a tip is attached, a piezoelectric drive mechanism which drives the tip and to which the tip holder is detachably mounted, a sample holder holding a sample, and a sample stage on which the sample holder is mounted. It is assumed that the Z-axis extends through the tip holder and across the surface of the sample during observation. This microscope is characterized in that a replacement rod having a chuck gripping the sample holder or the tip holder is mounted so as to be movable along the Z-axis. The sample holder and the tip holder can be easily replaced on the Z-axis by the replacement rod.

In accordance with any of these two embodiments of the invention, even an unskilled operator can easily replace fine tips and samples in a short time.

In a further embodiment of the invention, the scanning tunneling microscope comprises a tip drive mechanism for driving a tip holder mounted detachably, an observation chamber accommodating the drive mechanism, a transfer chamber connected with the observation chamber via a first partition valve, a preliminary chamber connected with the transfer chamber via a second partition valve, an insertion rod for inserting a new tip into the transfer chamber via both preliminary chamber and second partition valve, a moving member which can carry new tips introduced by the insertion rod and can be moved inside the transfer chamber between a first position where the new tips are installed on the moving member and a second position where new tips are inserted into the observation chamber, and a replacement rod which, when the moving member is in the second position, receives a new tip from the moving member and carries the tip into the observation chamber via the second partition valve. The tip and the sample can be quickly replaced while maintaining the ultrahigh vacuum.

In a still other embodiment of the invention, the above-described moving member takes the form of a transfer rod capable of moving between the aforementioned first and second positions in the transfer chamber. A plurality of new tips are detachably installed radially around the axis of the transfer rod. Since plural tips can be replaced within an ultrahigh vacuum, a long time is not needed to evacuate the inside of the instrument again, unlike the prior art instrument.

In yet another embodiment of the invention, the scanning tunneling microscope is adapted to detect tunneling currents by bringing a tip close to a sample and driving the tip in three dimensions, the microscope comprising a sample stage holding the sample, a piezoelectric drive mechanism driving the tip, a base on which the sample stage and the drive mechanism are disposed, a moving member for moving the drive mechanism along the Z-axis between a first position at which the mechanism is close to the sample on the base and disconnected from the drive mechanism and a second position at which the mechanism is distant from the sample. Thus, when the sample is treated, the tip can be moved away from the sample. When the tip is brought close to the sample to observe it, the moving member is disconnected from the drive mechanism. Therefore, it is unlikely that vibration is transmitted to the drive mechanism via the moving member.

Having thus described my invention with the detail and particularity required by the Patent Laws, what is claimed and desired to be protected by Letters Patent is set forth in the following claims.

What is claimed is:

1. A scanning tunneling microscope comprising:
a tip holder having a tip;

a piezoelectric drive mechanism which drives the tip and to which the tip holder is detachably mounted;

means for holding a sample;

a replacement rod for replacing the tip holder, the replacement rod being mounted so as to be moving along the Z-axis of a coordinate system, the Z-axis extending through the tip holder and across the surface of the sample during observation; and means for moving the sample away from the Z-axis during the replacement.

2. A scanning tunneling microscope comprising:

a tip holder having a tip;

a piezoelectric drive mechanism which drives the tip and to which the tip holder is detachably mounted;

a sample holder holding a sample; and a sample stage upon which the sample holder is mounted; and a replacement rod having a chuck for gripping the sample holder or the tip holder, the replacement rod being mounted so as to be moving along the Z-axis of a coordinate system, the Z-axis extending through the sample holder and across the surface of the sample during observation.

3. A scanning tunnelling microscope comprising:

a tip drive mechanism for driving a tip mounted detachably;

an observation chamber accommodating the drive mechanism;

a transfer chamber connected with the observation chamber via a first partition valve;

a preliminary chamber connected with the transfer chamber via a second partition valve;

an insertion rod for inserting a new tip into the transfer chamber via both preliminary chamber and the second partition valve;

a moving member which carry new tips introduced by the insertion rod and is moved inside the transfer chamber between a first position where the new tips are installed upon the moving member and a second position where the new tips are inserted into the observation chamber; and a replacement rod which, when the moving member is in the second position, receives a new tip from the moving member and carries the tip into the observation chamber via the second partition valve.

4. The scanning tunneling microscope of claim 3, wherein the moving member takes the form of a transfer rod capable of moving between the first and second positions in the transfer chamber, and wherein a plurality of new tips are detachably installed radially around the axis of the transfer rod.

5. A scanning tunneling microscope comprising:

a tip holder having a tip;

a sample stage holding a sample in such a way that the tip is spaced from the sample surface along the Z-axis of a coordinate system;

a piezoelectric drive mechanism driving the tip and to which the tip holder is detachably mounted;

a base upon which the sample stage and the piezoelectric drive mechanism are disposed; and a mechanical means for moving the drive mechanism along Z-axis between a first position at which the mechanism for cleaning the sample surface is close to the sample upon the base and a second position at which the mechanism is distant from the sample.

* * * * *